Feb. 15, 1938.    C. F. JONES    2,108,201
CINEMATOGRAPHIC CAMERA
Filed June 1, 1935    7 Sheets-Sheet 1
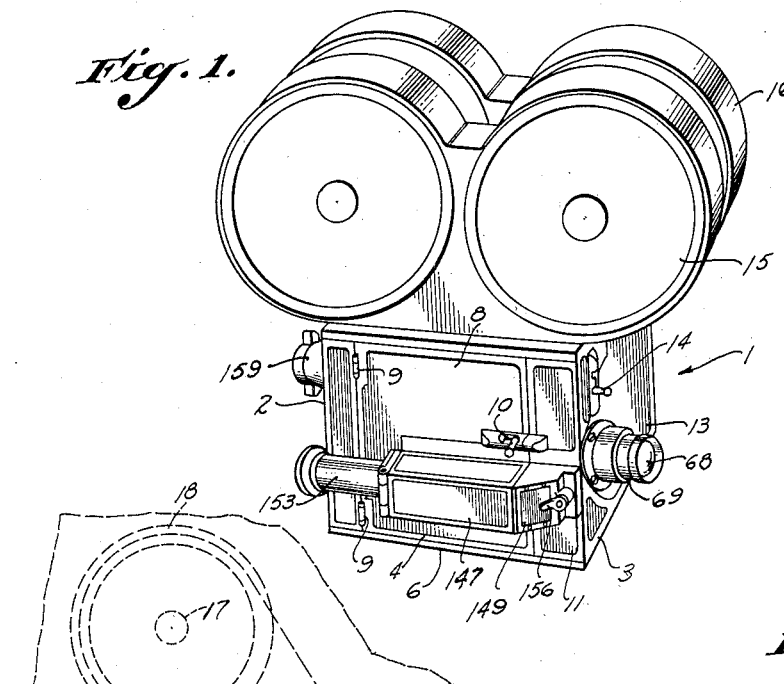
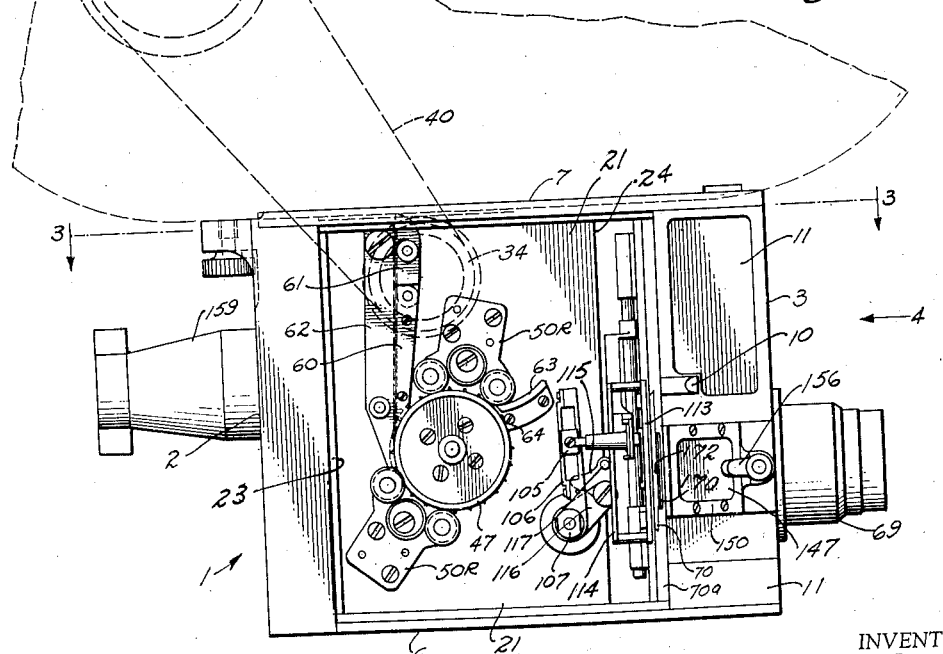
INVENTOR.
Charles F. Jones,
BY Robert W. Fulwider
ATTORNEY.

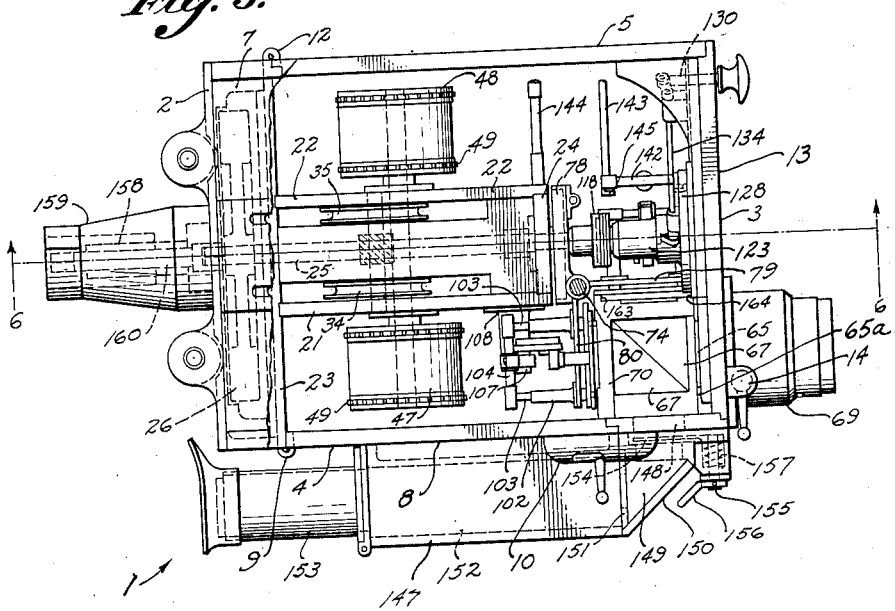

Feb. 15, 1938.                     C. F. JONES                       2,108,201
                              CINEMATOGRAPHIC CAMERA
                              Filed June 1, 1935              7 Sheets-Sheet 3
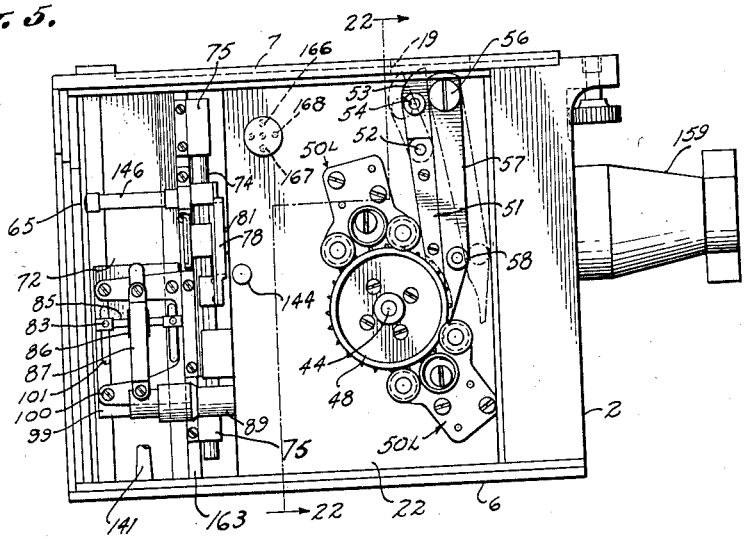
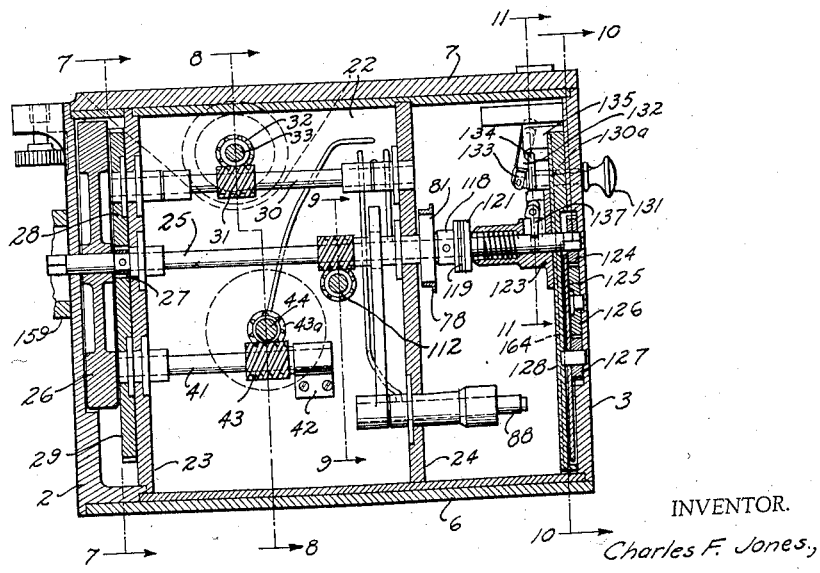
INVENTOR.
Charles F. Jones,
BY Robert W. Fulwider
ATTORNEY.

Feb. 15, 1938.    C. F. JONES    2,108,201
CINEMATOGRAPHIC CAMERA
Filed June 1, 1935    7 Sheets—Sheet 4
Fig. 7.
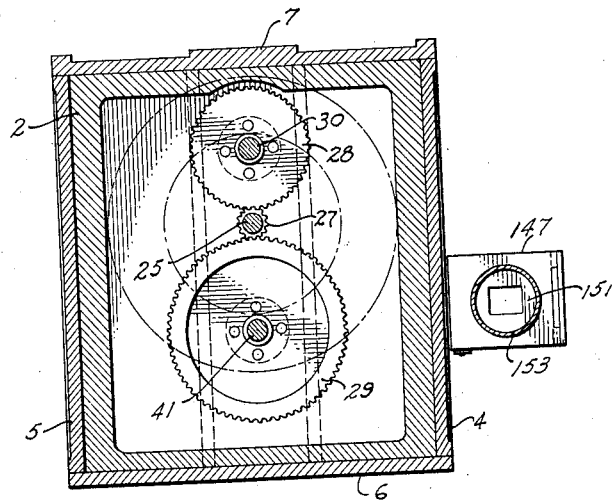
Fig. 8.
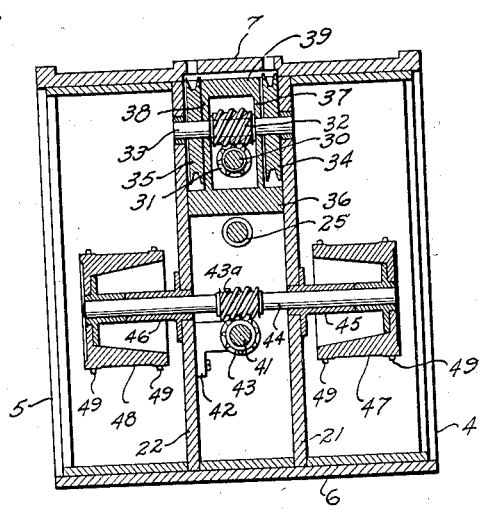
Fig. 9.
INVENTOR.
Charles F. Jones,
BY Robert W. Fulwider
ATTORNEY.

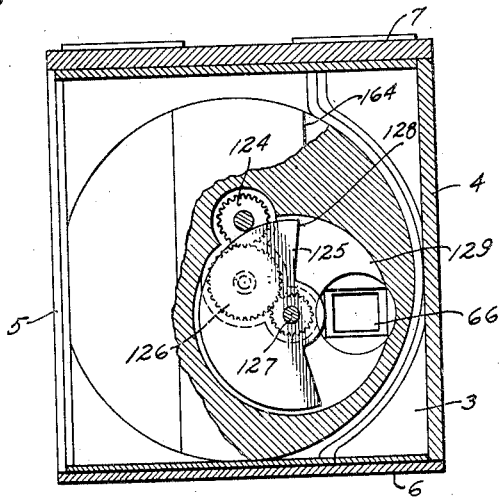
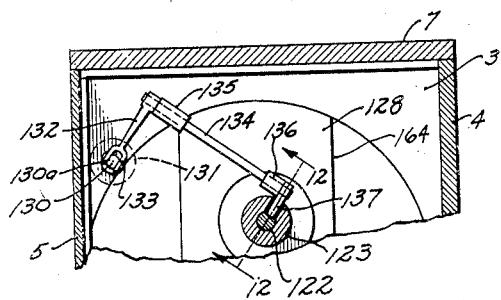
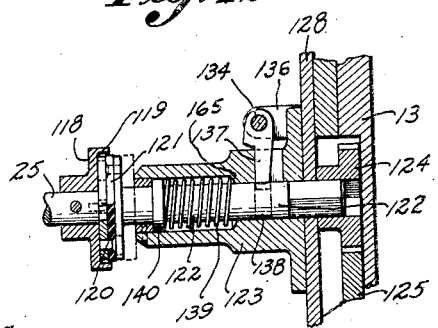
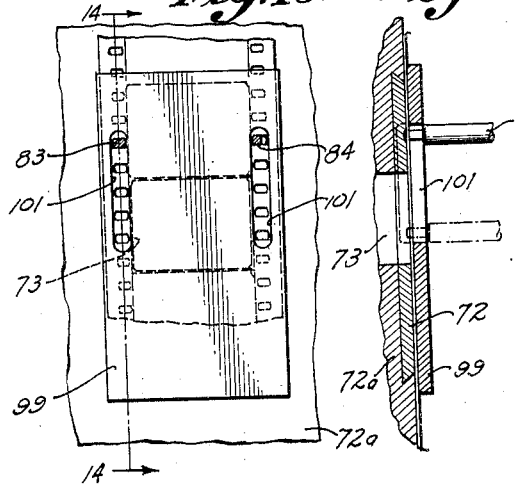
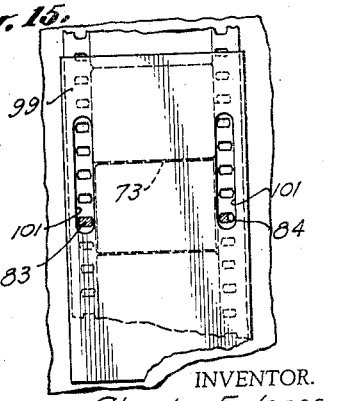
INVENTOR.
Charles F. Jones,
BY
ATTORNEY.

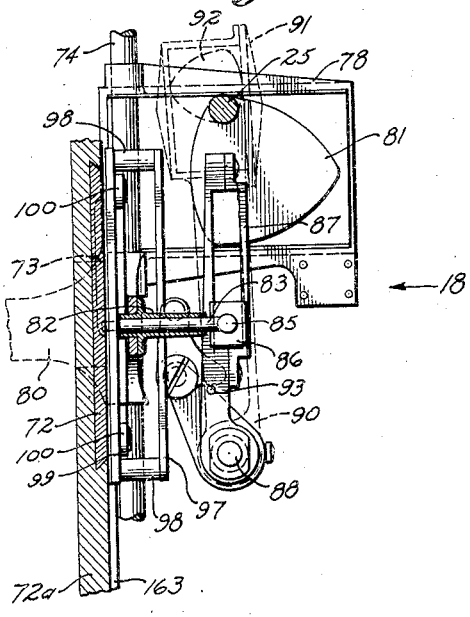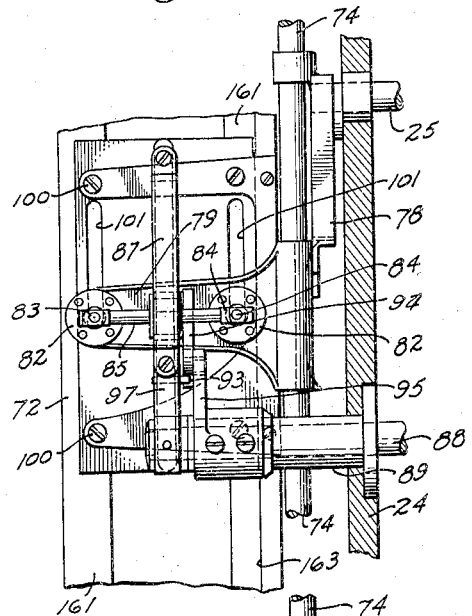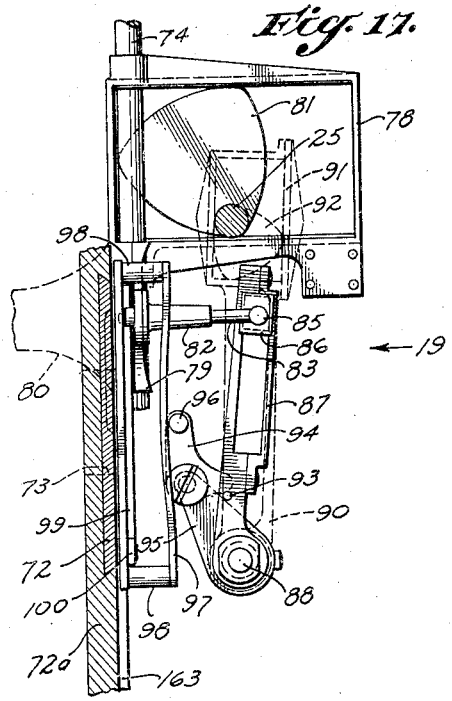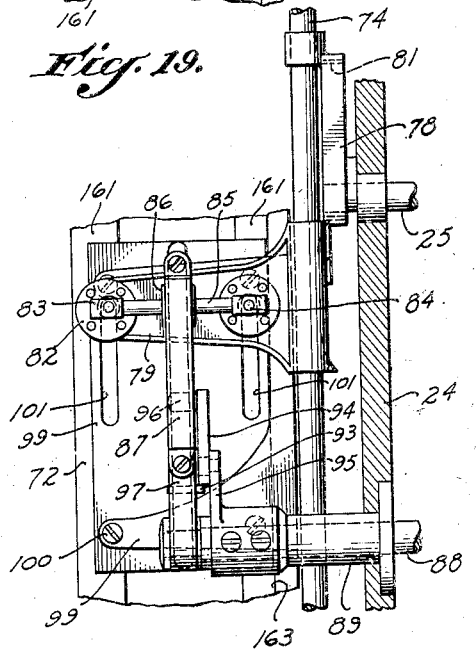

Feb. 15, 1938.  C. F. JONES  2,108,201
CINEMATOGRAPHIC CAMERA
Filed June 1, 1935  7 Sheets-Sheet 7

INVENTOR.
Charles F. Jones,
BY
ATTORNEY.

UNITED STATES PATENT OFFICE 2,108,201

CINEMATOGRAPHIC CAMERA

Charles F. Jones, San Francisco, Calif., assignor to Tricolor, Inc., a corporation of California Application June 1, 1935, Serial No. 24,514

15 Claims. (Cl. 88—16.6)

My invention relates broadly to cinematographic cameras and particularly to cameras adapted to expose a plurality of films simultaneously, although many of the features of my improved camera are applicable to, and very valuable when used in connection with ordinary cameras for numerous phases of motion picture work.

There are many uses for a camera capable of simultaneously exposing two or more films in such a manner that perfect registry can be had when the exposed films are superimposed, as is the practice in numerous systems of color photography, so-called "trick" photography and other specialized branches of the photographic art.

In many systems of color cinematography it becomes necessary in printing to accurately register a plurality of color separation negatives with each other and with the positive raw stock. This is quite customarily done by means of registering pins at the printing aperture, one of which is full fitting and one partially fitting as disclosed in the patent to Kelley and Mason No. 1,350,023, issued August 17, 1920. Heretofore cameras employing pulldown pins have been designed to have the pins engage perforations below the aperture for the purpose of advancing the film through the camera, and it is one of the objects of my invention to provide pin means for advancing a plurality of films which will engage perforations opposite the aperture, so that when the negatives are subsequently used in printing a single positive with the usual type of printer, the same perforations will be used in the printing operation to secure registry as were used in the camera to advance the films and register them at their respective apertures.

Another object of my invention is to provide a camera having a light dividing means therein and apertures angularly disposed with respect to each other in which the magazines are located side by side in substantially parallel relationship so that they can be readily driven from the same shaft. This feature of my camera makes possible a neat and compact structure which can otherwise be had only with difficulty. To efficiently accomplish this purpose, I have devised a means for leading one of the films used in my camera around a corner in the camera without the use of spools or sprockets and in such a manner as to completely protect the film from abrasion.

Heretofore it has been customary in cameras both for black and white work and for color work to "break" the film back rather sharply over the entrance slit of the magazine for the take-up and to rely on the take-up to carry the entire responsibility of removing the film from the camera. It is a further object of my invention to provide a definite improvement over this heretofore known means, by providing a positive feed from the camera into the magazine so that in case of film breakage or failure of the take-up mechanism, there will be a considerable length of time allowed the operator in which to discover the failure and remedy the cause or stop the camera before any damage has occurred.

By locating my pull-down mechanisms in back of their respective films, it becomes possible to have the claws or pull-down pins of both mechanisms in the same plane, which is very desirable mechanically and allows similarly located perforations of all films to be engaged simultaneously.

It is also an object of my invention to provide a camera in which all movements are positive, sure and silent, particularly in the film advancing means at the apertures, and it will be seen that by my improved cross-head type of pull-down mechanism, I have effectually accomplished this purpose. Likewise, it will be seen that I have provided a simple and effective type of pressure plate spring and actuating means which is extremely silent in its operation.

In all types of cameras, it is essential that vibration be cut down to a minimum and that as little sound as possible be transmitted to the outer casing from the internal mechanism. It is therefore an object of my invention to provide a means for minimizing vibration and sound transmission to the outer casing or box and I accomplish this by providing a non-metallic coupling in the shutter drive which allows a positive drive without the transmission of vibration or sound.

To protect the internal drive shaft and related mechanism of the camera, I employ a shaft extension connected to the main drive shaft in such a manner that a sudden blow on the outer or extension shaft will not injure the internal main shaft.

These and other objects and advantages will become readily apparent from the following detailed description of a preferred form of my invention and by reference to the accompanying drawings. In the description and drawings, I will refer to the end of the camera carrying the lens as the front end, and the opposite end thereof as the rear end. Also, in designating the sides of the camera, I will consider that one is standing behind the camera and looking toward the front end, and with that as a premise, I will refer to the sides of the camera as the right and left sides respectively.

In the drawings:—

Fig. 1 is a side elevational view in perspective of the assembled camera and magazines viewed from the right front.

Fig. 2 is an elevation of the right side of the camera with the side door removed and the magazines in dotted position broken away.

Fig. 3 is a top plan view taken at 3—3 in Fig. 2 with the cover removed.

Fig. 4 is a front elevation with the front door removed.

Fig. 5 is an elevation of the left side with the door removed.

Fig. 6 is a vertical section taken at the line 6—6 in Fig. 3, looking from right to left as indicated by the arrows.

Fig. 7 is a vertical section taken at the line 7—7 in Fig. 6 looking forward.

Fig. 8 is a vertical section taken at 8—8 in Fig. 6 looking forward.

Fig. 9 is a partial vertical section taken at 9—9 in Fig. 6 looking forward.

Fig. 10 is a vertical section of the front door taken at 10—10 in Fig. 6 and looking forward.

Fig. 11 is a partial vertical section taken at 11—11 in Fig. 6 looking forward.

Fig. 12 is a sectional view of the shutter shaft engaging means taken at 12—12 in Fig. 11.

Fig. 13 is a front view of one of the pressure plates with a strip of film broken away, showing the pull-down pins as they start to pull the film down.

Fig. 14 is a vertical section taken at 14—14 in Fig. 13 showing the pins of Fig. 13 in full lines and the pins of Fig. 15 in dotted lines.

Fig. 15 is a view similar to Fig. 13, but showing the pins at their lower position after having pulled the film down one frame.

Fig. 16 is a side view of the film advancing mechanism with the pins in engagement.

Fig. 17 is the same as Fig. 16, but with the pins disengaged and the pressure plate spring flexed.

Fig. 18 is a front view of the film advancing mechanism as indicated by the arrow 18 in Fig. 16.

Fig. 19 is a front view of the film advancing mechanism as indicated by the arrow 19 in Fig. 17.

Figure 20:
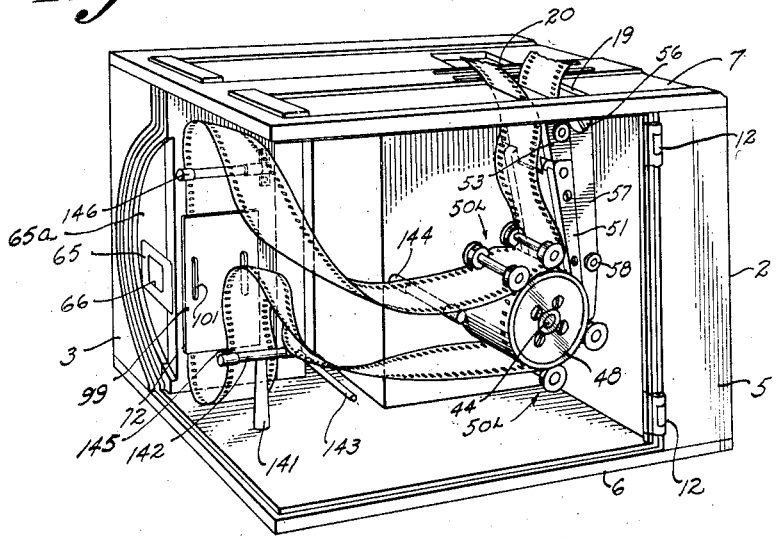
Fig. 20 is a perspective of the camera with the front door removed showing the film path.

Referring now to the drawings and particularly to Figs. 1 and 3, the numeral 1 indicates generally a light-tight camera box or casing comprising rear wall 2, front wall 3, right side wall 4, left side wall 5, base 6 and cover 7. The greater portion of right wall 4 forms a door 8 provided with hinges 9 at the rear end thereof and with a latch 10 at the front end adapted to lock said door in closed position. The comparatively narrow forward portion of side wall 4, between the door 8 and the front wall 3, I will term the side wall strip 11. The major portion of front wall 3 and the forward portion of left side wall 5 are preferably built as one piece and hinged to the rear portion of left wall 5 by hinges 12 and will hereafter be referred to as the front door 13 and by that term indicating the combination of front wall 3 and the forward portion of left wall 5. A latch 14 may be provided at the junction of front door 13 and the stationary portion of front wall 3 to lock the front door 13 in closed position when operating the camera.

Detachably fastened to the upper face of cover 7 is a pair of film magazines 15 and 16 of any suitable shape, each provided with spindles 17 therein adapted to receive a pair of reels (not shown) for winding film thereon. The magazines are preferably spaced a short distance apart in parallel relationship and the rear spindle 17 of each is provided with a pulley 18 to rotate the same as a take-up reel. The cover 7 is provided with a pair of slits or apertures 19 and 20 to allow ingress and egress of the film, to said magazines, as shown in Fig. 20.

As shown best in Figs. 2 and 3, spaced a short distance inside of rear wall 2 is a rear partition or false wall 23 extending across the back of the casing 1 and parallel to rear wall 2. Centrally positioned in the box 1 is a pair of partition walls 21 and 22 spaced apart in parallel relationship and extending from the rear partition wall 23 forwardly to a point preferably forward of the midpoint of the box 1, and vertically from the base 6 to the cover 7. At the forward end of partition walls 21 and 22 they are joined by a vertical end plate 24.

Suitably journaled in rear wall 2, rear partition 23 and vertical end plate 24 is a main drive shaft 25 centrally located with respect to the partition walls 21 and 22 and preferably above the midpoint between base 6 and cover 7. The rear end of shaft 25 is provided with a square end adapted to engage the female end of an extension shaft 160 journaled in bearing 158 which is protected by a frustro-conical motor bracket 159 of conventional design. The camera, of course, can be operated either by hand with a crank or by a motor in the usual manner. Mounted on drive shaft 25 and fast thereto is a flywheel 26 which rotates in the space between rear wall 2 and rear partition 23. Fastened on the drive shaft 25 immediately forward of flywheel 26 is a pinion 27 which drives upper and lower gears 28 and 29 respectively as shown in Fig. 6. Upper gear 28 is keyed to the rear end of a take-up drive shaft 30 journaled in rear partition 23 and end plate 24, which shaft carries a wheel 31 meshing with a worm 32 on a shaft 33 journaled in the upper portion of partition walls 21 and 22. Fast to the shaft 33 on either side of the worm 32 are take-up drive pulleys 34 and 35 which rotate in separate compartments formed by a base plate 36 with two upstanding wall portions 37 and 38 covered by a horizontal plate 39. A belt 40 connects take-up drive pulley 34 to take-up pulley 18 to drive the same. A similar belt (not shown) also runs from drive pulley 35 to drive the other take-up pulley (not shown) on the magazine 16. The foregoing mechanism of gear 28, shaft 30, wheel 31, worm 32, shaft 33 and pulleys 18, 34 and 35, I will hereafter refer to collectively as the take-up driving mechanism.

The lower gear 29 is keyed to the rear end of a shaft 41 which is journaled in rear partition 23 and a bearing bracket 42 mounted on the inside of partition wall 22. Near the forward end of shaft 41 is a worm 43 which meshes with a gear 43a on a transverse shaft 44 which extends through side partitions 21 and 22 and rotates in the flanged bearings 45 and 46 which extend outwardly from plates 21 and 22 respectively. Keyed to opposite ends of shaft 44 are film feed sprockets 47 and 48, each provided with two annular rows of teeth 49 spaced along their peripheral edges for engaging the perforations of the respective films to be fed through the camera.

Figure 22:
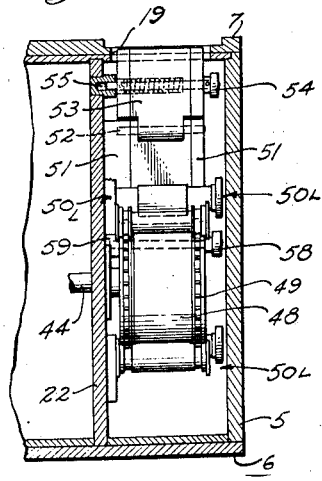
Fig. 22 is a vertical section taken at 22—22 in Fig. 5.

Above and below the feed sprockets 47 and 48 are adjustable hold-down roller mechanisms 50R and 50L respectively which may be of conventional design as shown best in Figs. 2, 5, and 22, and which are mounted on the partition walls 21 and 22 respectively.

Referring now to Fig. 5, it will be seen that fastened to partition 22 and substantially perpendicular thereto is a guide plate 51 whose lower end is tapered off to allow it to be in close relationship to the upper side portion of sprocket 48 with its outer face substantially tangential to the rear side of the periphery of sprocket 48. The upper end of guide plate 51 is cut away to provide a notch through the sides of which a pin 52 passes and upon said pin is pivotally mounted an upper guide segment 53 of substantially the same width as guide plate 51. Guide segment 53 extends upwardly into aperture 19 terminating substantially flush with the upper face of cover 7. The segment 53 is cored transversely in its middle portion and a pin 54 is spring mounted therein and adapted to seat in a recess 55 provided on partition 22 in such a position that when pin 54 is seated therein the faces of guide segment 53 are in the same planes as the faces of guide plate 51. Both faces of guide plate 51 and guide segment 53 are formed with slightly raised ridges along each side thereof to provide low side walls to act as guiding track means for the perforated edges of the film traveling lengthwise of said faces.

Pivotally mounted on partition 22 by a pin 56 immediately to the rear of recess 55 is a downwardly extending elongated shoe 57 with a recessed central section formed between raised parallel edge portions or tracks corresponding to those of guide plate 51 and guide segment 53. Shoe 57 is adapted to swing into contact with the rear face of guide plate 51 and guide segment 53, as shown by the full lines in Fig. 5 to form a closed film passage in conjunction therewith, the edges of the film being engaged between the respective pairs of tracks and held against lateral movement thereby. The shoe 57 extends somewhat below the lower end of guide plate 51 and has its lower end curved inwardly to coincide with a portion of the periphery of sprocket 48, so that a film on the lower side of the sprocket and traveling therewith, will pass directy up between first, the sprocket and shoe, and then between the shoe and guide plate without change of direction. Shoe 57 is provided with a spring catch pin 58 adapted to seat in an appropriate recess 59 to hold the shoe 57 in substantial contact with guide plate 51 with just enough clearance to allow free passage of the film therebetween.

On the right partition wall 21 as illustrated in Fig. 2 a similar assembly is mounted adjacent the sprocket 47 comprising a guide plate 60, pivoted guide segment 61, and pivoted shoe 62. The arrangement and function of these parts may be identical with that of the ones just described mounted on partition 22. On this side of the camera, however, i. e. on partition 21, a short recessed arcuate plate 63 is conveniently mounted on the partition 21 as by screws 64 so that its rear and lower edge is parallel to and almost in contact with the periphery of sprocket 47. The plate 63 being located with its concave side up, a film being fed forward between the sprocket 47 and upper hold down roller mechanism 50R may be led across the plate 63 and upwardly therefrom towards the cover 7.

Figure 21:
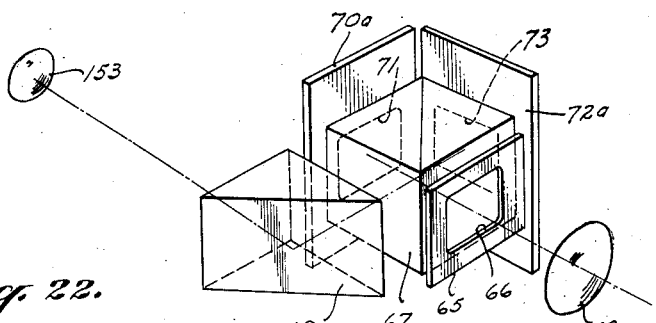
Fig. 21 is a schematic view in perspective of the lens system and direct view finder.

As shown best by Figs. 3, 20 and 21, the stationary portion of front wall 3 is provided with an inset wall portion 65a provided with a removable front or main aperture plate 65 with an aperture 66 behind which is mounted a light dividing member 67, which in the preferred form of my device illustrated, comprises a prism block formed by cementing two right-angled prisms together, the hypotenuse of one having been silver or gold sputtered or otherwise rendered semi-reflective, and semi-transparent so that light passing through aperture 66 from a lens 68 mounted in a suitable lens housing 69 on the front door 13 will be divided, one portion passing on through the light dividing means 67 with its direction unchanged, and the other portion being reflected at right angles to its original path.

Directly behind the prism 67 is a vertical wall plate 70A extending from the base 6 to cover 7 which is provided with a removable aperture plate 70 with an aperture 71 therein opposite prism 67 and in line with aperture 66. This aperture and plate I will term the rear aperture and aperture plate respectively. Angularly disposed to rear aperture plate 70 and front aperture plate 65, preferably at substantially 90° and forming a closure therewith is side wall 72a provided with a removable aperture plate 72 with an aperture 73 opposite said prism 67 and in the optical path of front aperture 66. All of these apertures are made of suitable size to correspond with the frame size of the film being used. Both aperture plate walls 70a and 72a are provided with raised edge portions 161 to provide tracks for supporting the edges of film passing over them.

Adjacent to the intersection of rear aperture plate wall 70a and side aperture plate wall 72a is a vertical guide 74 suitably secured to the said aperture plate walls as by brackets 75. Opposite the guide 74 and parallel thereto adjacent the juncture of end plate 24 and partition wall 22 an auxiliary guide 76 is secured to end plate 24 by a suitable bracket 77 at its lower end. Slidably carried by guides 74 and 76 is a reciprocating pull-down pin carriage comprising a box type cam follower 78 and horizontal arms 79 and 80 at right angles to each other, whose function will shortly be discussed in detail. Fast to the drive shaft 25 and disposed to rotate within the cam follower 78 is a positive motion plate cam 81 whose rotation will cause periodic vertical reciprocation of the pull-down pin carriage. A pair of flanged bearings 82 extend outwardly from the arm 79 and are spaced apart a distance equal to that between the rows of perforations on the film to be used in the camera. The arm 79 extends transversely to the film path and adjacent the aperture 73. Pull down pins 83 and 84 are slidably mounted in the bearings 82 and extend through the arm 79 into vertically elongated grooves (not shown) in the side aperture plate 72 on either side of aperture 73. The head of pin 83 is of the type known as a full fitting i. e., it is substantially the exact size and shape of a film perforation and is adapted to entirely fill a perforation when inserted therein as shown in Figs. 13 and 15. The other pull down pin 84 is of the type known in the art as partially fitting or floating, in that it is full fitting from top to bottom, but cut away on its sides to give lateral play in the perforation to allow for variations in the film due to shrinkage, etc.

The other or outer ends of pull down pins 83 and 84 are secured to a cross-arm 85 which has a block or cross-head 86 fast to its midsection which is adapted to reciprocate vertically in a guide 87. The guide 87 is in the nature of a frame whose lower end is fast to a horizontal shaft 88, supported in a bearing 89, mounted in the lower part of vertical end plate 24. A crank 90 is keyed to the inside end of shaft 88 and is provided with a box type cam follower 91 surrounding a small plate cam 92 as shown in dotted lines in Figs. 16 and 17, mounted on the drive shaft 25 just inside the vertical end plate 24. Rotation of the drive shaft 25 causes rotation of the cam 92 which oscillates cam follower 91, crank 90, and shaft 88, which in turn causes guide 87 to oscillate, reciprocating the pins 83 and 84 horizontally in their respective bearings 82.

A pin 93 is located on the rearward side of guide 87 and is so disposed as to be in slidable contact with the under side of one arm of a bell crank 94 pivotally mounted on a bracket arm 95 fixed to the bearing 89. The other arm of crank 94 is provided with a pin 96 adapted to bear against a vertical spring strip 97 fastened by suitable means such as pins 98 to a pressure plate 99 extending across the aperture 73 and supported loosely against the aperture plate 72 by means of loose fitting bolts 100, carried by a two-fingered bracket 162 fastened on a guide rail 163 extending along the inside edge of aperture plate wall 72a. The guide rail 163 also serves to guide the inside edge of a film advancing down the face of aperture plate 72. The pressure plate 99 is provided with a pair of vertical slots 101 spaced apart a distance equal to that between the pull down pins 83 and 84 and are of sufficient length to accommodate said pins during their entire vertical movement.

A similar pull down mechanism is disposed behind the rear aperture plate 70 as shown best by Figs. 2, 3 and 9, wherein it will be seen that the arm 80 of the pull down carriage extends across the aperture 71 in a manner corresponding to the position taken by the arm 79 with respect to side aperture 73. The arm 80 is provided with a pair of pull down pin bearings 102 carrying pull down pins 103 connected by a cross-arm 104. The cross arm 104 has a cross-head block 105 slidable in a guide 106 which is mounted on the end of a shaft 107 rotatable in fixed bearing 108 extending outwardly from partition 21. As seen in Figs. 3 and 9, a vertical crank 109 is keyed on the inside end of the shaft 107 and carries a box type cam follower 110 in which a small plate cam 111 rotates by reason of being mounted on a shaft 112 worm geared to the drive shaft 25. Likewise a slotted pressure plate 113 is loosely held against rear aperture plate 70 by a spring strip 114 against which one end of a bell crank 115 bears. The crank 115 is pivoted on a bracket arm 116 and operated by the movement of a pin 117 carried by guide 106.

Referring now particularly to Figs. 6, 10, 11 and 12, it will be seen that the drive shaft 25 terminates just forward of the cam 81 with a circular plate 118 fast thereto. The face of plate 118 is provided with an annular flange 119 and a plurality of differentially spaced stub pins 120 adapted to seat in opposite differentially spaced holes in a non-metallic coupling 121 on the end of a stub shaft 122 extending inwardly from the front door 13. The stub shaft 122 is rotatably and slidably supported in a flanged housing 123 rigidly secured to the inside face of door 13. The forward end of stub shaft 122 is slidably keyed to a gear 124 which rotates a shutter 125 through intermediate gears 126 and 127. The gear train and shutter are preferably enclosed by an inside cover plate 128 provided with a vertical shoulder 164 adapted to fit against the outside edge of aperture plate wall 72a thus forming an outside guide rail cooperating with inside guide rail 163 to guide the film in its travel down the aperture plate wall 72a. The shutter 125 is provided with a suitable opening 129 which will intermittently expose the main aperture 66 to light rays from lens 68.

A flanged bearing 130a is provided in the front door 13 preferably in the top thereof and on the side opposite lens housing 69, in which a slidable pin 130 with a knob 131 is inserted with the knob on the outside of the door. Pivotally secured to the inside end of the pin 130 is a crank arm 132 having a bifurcated end 133 into which the end of pin 130 is inserted and fastened. The other end of crank 132 is fastened to one end of a rod 134 journaled in brackets 135 and 136 on cover plate 128. A dog 137 is fastened to the other end of rod 134 and extends downwardly through a well in the bearing 123 to seat in an annular groove 138 in the shaft 122, so that movement of the dog 137 will cause the shaft 122 to slide longitudinally in the bearing 123. A comparatively stiff helical spring 139 surrounds the shaft 122, bearing between an internal shoulder 165 in housing 123 and an annular flange 140 on the shaft 122. The spring 139 being under compression at all times urges the shaft 122 outwardly of the bearing 123 or rearwardly in the camera so as to insure a positive driving connection between the non-metallic coupling 121 and plate 118 when the camera is in operation. When it is desired to disconnect the stub shaft 122 from the drive shaft 25, as when the front door 13 is to be opened, the pin 130 is pulled out by grasping the knob 131. This in turn moves the crank 132 laterally, causing rotation of the rod 134 which rotates the dog 137 (in a counterclockwise direction in Fig. 12), to force the shaft 122 forward against the action of the spring 139. The parts are so proportioned that sufficient movement of the shaft is had to completely disengage the pins 120 of plate 118 from the corresponding holes in the coupling 121. The pin 130 may be provided with holding means (not shown) for retaining it in outward position when it is desired to hold the stub shaft out of contact for some time.

Disposed substantially on the projected line of side partition 22 and opposite the side aperture plate 72 as seen most clearly in Fig. 20, is an upstanding post 141 supporting a horizontal cross-arm 142 which is opposite the aperture plate 72 and a second cross-arm 143 perpendicular to arm 142 substantially in line with the lower side of feed sprocket 48. Also in line with sprocket 48, but with the upper side thereof, is an arm 144 projecting horizontally out from the side partition 22 at its forward end. The ends of arms 142 and 144 are preferably shouldered to provide a bearing surface for the edges of film pulled across them. A pair of L-shaped fingers 145 extend from the side of arm 142 facing the aperture plate 72 and act as film guides holding the edges of the film to prevent excessive lateral movement thereof.

Having described the various principal parts of my camera, I will now proceed to explain in detail their operation and how the respective parts coordinate to produce the improved novel results heretofore mentioned.

The magazines 15 and 16 are loaded with reels of raw stock and provided with take-up reels in the conventional manner. The film in magazine 15 is led down through the aperture 20 and along the front face of guide segment 61 and guide plate 60 to the feed sprocket 47. The film perforations are then engaged with the teeth 49 of the upper side of sprocket 47 and held thereagainst by the upper hold-down roller mechanism 50R. The film is advanced by the rotation of feed sprocket 47 and as it leaves said sprocket it is diverted upwardly and forwardly by the arcuate plate 63 and is led thence over and down between rear aperture plate 70 and pressure plate 113. The rear pull-down pins 103 are registered in appropriate perforations of the film as more fully explained hereinafter and the film intermittently advanced across the aperture 71. The film then returns to the under side of feed sprocket 47, is held thereagainst by the lower hold-down roller mechanism 50R and is fed upwardly between the guide plate 60 and guide segment 61 on the one side and shoe 62 on the other, to exit through aperture 20 and be wound up on the take-up reel 18 operated by the belt 40 from drive pulley 34 as hereinbefore described. By reason of the film fitting snugly and being sustained on both faces during its travel between the sprocket 47 and the aperture 20 by means of the shoe 62, a positive feed is accomplished so that if the take-up reel should fail to operate, or a film break should occur in the magazine, the film will not pile up in the camera, but will continue to be fed up into the magazine for an appreciable time, thus giving the cameraman a chance to discover the failure and stop the camera before any film is lost.

Referring now to Fig. 20, it will be seen that the unexposed film from magazine 16 is led down through aperture 19, and across the upper portion of sprocket 48, where it is held in driving contact with the teeth 49 by the upper hold down roller mechanism 50L. Rotation of the sprocket 48 feeds the film across guide arm 144, whereupon the film is twisted and led around the corner formed by partition 22 and vertical end plate 24 and down between side aperture plate 72 and pressure plate 99 across the aperture 73. If desired an extra guide arm 146 adjacent the upper end of aperture plate 72 may be provided to assist in straightening out the twist in the film before it reaches the pressure plate 99. After the film is pulled down, across the aperture by the pins 83 and 84, it passes under the pull-down mechanism and up over arm 142, being held in position thereon by guides 145 as previously explained. The film is then again twisted and passes over horizontal arm 143 to return to the under side of sprocket 48 to be fed back up into the magazine 16 as previously explained with regard to the identical shoe mechanism on the other side of the camera. It should be noted at this point that in its travel the film is at all times protected from scratching the emulsion. Guide bars 142 and 144 over which the film travels emulsion side down have enlarged shoulder ends so that only the film edges are in contact therewith, and in addition as to bar 144, the upper twist in the film prevents all but the inside edge from contacting that arm. As to guide arms 143 and 146, the back of the film is the bearing surface and as mentioned, bar 146 has shouldered ends and as to bar 143, the lower twist of the film causes it to ride only on its inner edge. By thus regulating the film path I can use a very compact camera for exposing a plurality of separate films simultaneously, and also secure the additional advantage of having the two magazines in parallel relationship where they can have substantially a common take-up mechanism.

Referring particularly now to Figs. 13, 14 and 15 wherein full size views of a strip of standard motion picture film are shown with the pressure plate and pull down pins isolated, it will be seen that the bottoms of the slots 101 fall approximately at the center of the aperture 73 and the slots extend upwardly a little over one frame distance so that when the pins 83 and 84 are at the top of their stroke, they enter the film perforations approximately one frame distance above the center of the aperture. When the pins move downwardly the length of the slots 101, they pull the film down one aperture length or one frame and at the time of withdrawal the registering perforations are at approximately the center of the aperture and preferably slightly below. By thus causing the pins to engage what become the lower center perforations when the film is being exposed, it is possible to have the two resultant negatives registered with the same perforations in printing as it is customary to use similar pins for that purpose disposed near the center of the aperture as are pins 83 and 84 at the end of their pull-down stroke. In Fig. 13 the pins are shown in their top position just before the pull-down, and in Fig. 15 they are shown after having completed one-half of their cycle and have pulled the film down one frame across the aperture. As will be readily apparent to those skilled in the art, registering the negative in the camera by the same perforations as are later used in printing is a decided improvement in the art and provides a simple method of eliminating many heretofore serious troubles due to uneven or excessive shrinking of the film on processing.

In Fig. 17 it will be seen that the reciprocating pull-down carriage is in its uppermost position, the pull-down pins 83 and 84 are withdrawn and the pressure plate is held securely against the aperture plate (the film if camera is threaded) by reason of the bell crank 94 pressing against the spring strip 97. As the carriage reciprocating cam 81 rotates clockwise, the follower 78 remains stationary, but rotation of the pull-down pin reciprocating cam 92 swings its follower 91 on the upper end of crank 90 in toward the aperture plate 72. This motion pushes the pins 83 and 84 in toward the aperture plate 72 and if a film is properly threaded between the aperture plate and the pressure plate, the pins will enter the perforations thereof substantially one frame distance above the aperture center line as previously explained. As the crank 90 moves in toward the aperture plate 72, the pin 93 slides along the lower edge of bell-crank 94, allowing it to be rotated clockwise by the flexure in spring strip 97, so that when the pins 83 and 84 are fully inserted in their appropriate perforations, the spring strip is in its normal unflexed position and the pressure plate 99 is fully released.

As the cam 81 continues its clockwise rotation, the film advancing carriage including the pins 83 and 84 is moved downwardly to advance the film the required distance, at which point the mechanism is in the position illustrated in Fig. 16 where it will be seen that the pull down pins are still engaged with the film, the pressure plate is released and the carriage is at its lowest point with regard to the slots 104. Further rotation of the cam 81 from this position leaves the follower 78 stationary, but the small cam 92 moves the crank 90 outwardly to withdraw the pins 83 and 84 from engagement with the film and flexes the spring strip 97 by raising the lower end of bell crank 94 which causes the pressure plate 99 to again clamp the film against the aperture plate and hold it there while the pull down carriage rises to repeat the cycle.

The shutter 125 is, of course, timed so that it exposes the films during the time that they are clamped against the aperture plate in stationary position, and as previously mentioned by having the pins 128 differentially spaced the shutter will always be in the proper timed relationship with the drive shaft. The feed sprockets and take-up mechanism work continuously to supply and withdraw the film to and from the intermittent film advancing mechanism as is the custom in conventional cameras at present. The operation of the pull-down pins 103 is, of course, identical with that just explained for the pins 83 and 84 and in synchronism therewith. The pin carrying arms 79 and 80 both being part of the film advancing carriage and being in the same plane makes it possible for the two films to be advanced simultaneously by engagement with identically located perforations.

Returning now to Figs. 1 and 3, where my improved type of direct finder mechanism is best illustrated, the numeral 147 designates a relatively small box secured to the sidewall strip 11 opposite the light splitting means 67. The wall strip 11 is provided with an aperture 148 across which the box 147 fits. A reflecting surface as for example the right angled prism 149 is disposed within the box 147 so that its reflecting surface lies along the diagonal face 150 of said box.

The rear wall 151 of said box is provided with an aperture to allow free passage of light rays therethrough and down a light tunnel 152 in line therewith and secured to the side door 3. The front end of light tunnel 152 is adapted to make light tight engagement with rear wall 151 of box 147 when the door 3 is closed. On the rear end of light tunnel 152 a conventional eyepiece 153 is hingedly mounted in co-axial alignment therewith. A shutter 154 is pivotally mounted on a shaft 155 having a handle 156 on its outer end and a spring 157 on its inner end to keep the shutter 158 normally across the aperture 148. When it is desired to use the finder and view the scene upon which the lens 68 is focused, the handle 156 is depressed to open the aperture 148 and both images being recorded by the films will be seen through the eyepiece 153.

I find this type of direct finder very valuable in close work where it is necessary to preserve the photographic field to minute limits as in photographing surgical operations and other cases involving the production of extremely close shots.

Another feature of my camera, which is best shown by reference to Figs. 5 and 6, is the centrally positioned intake lubricating system. Preferably positioned on one of the partition walls, as for instance partition 22, is the intake terminus 166 of a plurality of oil lines 167 leading to the principal bearings of my camera to lubricate the same. In Fig. 5 I have shown the intake as comprising five lines, although it will of course be understood that this number may be varied at will. A pronged plug 168 may be provided to close the intake 166 to prevent extraneous matter from entering therein. By this arrangement the possibility of overlooking some major part when lubricating the camera is entirely obviated for an application of suitable lubricant to the one intake covers substantially the whole camera.

As heretofore mentioned, my camera finds a wide application in color photography where it is desired to produce a plurality of registered color value negatives simultaneously. When employing my camera for color work appropriate filters may be inserted at any convenient point in the respective component light paths. In the embodiment of my invention illustrated in the drawings and particularly Figs. 2 and 4 thereof, I have shown the filters 170 and 171 as positioned between the prism and the aperture plates respectively. Each filter is removable from its respective slot when the camera doors are opened. As will be seen from Fig. 2 a small groove or keyway 172 is provided in the rear partition wall 70a to allow a pin to be inserted for prying the filter out of its slot. For so-called two-color work the usual method is to use red and blue or green filters, although these are, of course, dispensed with if the film used is selectively sensitized. It will be readily apparent that my camera can also be used to produce more than two color value negatives, for by simply adjusting the pressure plate, two or more films can be advanced across either or both the apertures in face to face, back to back, or face to back relationship.

As required by the patent statutes, I have fully disclosed a preferred form of my invention which is fully capable of attaining the objects and providing the advantages mentioned herein, and it is to be expected that numerous changes and modifications will occur to those skilled in the art when applying my invention to particular problems. However, it is to be understood that the form herein disclosed is merely illustrative of the many novel features embodied in my invention and that the same is not to be limited thereto, but is to be afforded the full scope of the appended claims.

I claim as my invention:

1. A camera adapted to simultaneously expose a plurality of cinematographic films, comprising: a light tight casing having a lens therein and a light dividing means in line with said lens; a shutter optically aligned with said lens and said light dividing means; an aperture plate with an aperture in the path of each light beam emerging from said light dividing means; vertical guide means disposed in said casing; a vertically reciprocating carriage slidable on said guide means and provided with a pair of arms extending laterally of said aperture plates and adjacent thereto; a single pair of substantially horizontal pull down pins slidably mounted in each of said arms, one end of said pins being adapted to engage the perforations of a film disposed longitudinally of said aperture plate, and the other end of said pins being connected to a cross-arm vertically slidable in a guide adapted to be oscillated by a cam operated shaft; cam means for vertically reciprocating said carriage; driving means for operating both of said cam means; a spring operated pressure plate opposite said aperture adapted to hold said films against said aperture plates while said pull-down pins are out of engagement therewith; means for feeding said films to said pull down pins; and take-up means adapted to withdraw said films from said casing after their exposure.

2. A camera adapted to simultaneously expose a plurality of cinematographic films, comprising: a light tight casing having a lens therein and a light dividing means in line with said lens; a shutter optically aligned with said lens and said light dividing means; an aperture plate with an aperture in the path of each light beam emerging from said light dividing means; vertical guide means disposed in said casing; a vertically reciprocating carriage slidable on said guide means and provided with a pair of arms extending laterally of said aperture plates and adjacent thereto; a single pair of substantially horizontal pull down pins slidably mounted in each of said arms, one end of said pins being adapted to engage the perforations of a film disposed longitudinally of said aperture plate, and the other end of said pins being connected to a cross-arm vertically slidable in a guide adapted to be horizontally oscillated by a shaft, with a cam follower fast thereto and operated by a positive motion cam; cam means for vertically reciprocating said carriage; driving means for operating both of said cam means; a pressure plate opposite each aperture adapted to hold said films against said aperture plates while said pull-down pins are out of engagement therewith, said pressure plate being actuated by the movement of said shaft supporting said guide; means for feeding said films to said pull down pins; and take-up means adapted to withdraw said films from said casing after their exposure.

3. A camera adapted to simultaneously expose a plurality of cinematographic films, comprising: a light tight casing having a lens therein and a light dividing means in line with said lens; a shutter between said lens and said light dividing means; an aperture plate with an aperture in the path of each light beam emerging from said light dividing means; means for intermittently advancing separate films across each of said apertures; rotatable sprockets adapted to continuously withdraw said film from said advancing means; a substantially vertical guide plate with one face terminating substantially on the periphery of one of said sprockets; a guide shoe adapted to be swung into substantial contact with said guide plate to provide a restricted passage for a film leaving said sprocket so that the same will be held against lateral motion but free to move longitudinally; and means for taking up said film upon its exit from said restricted passage.

4. A camera as claimed in claim 3 wherein the guide plate and the guide shoe each are provided with raised edge portions to form a track for the support of the edges of said film.

5. A camera adapted to simultaneously expose a plurality of cinematographic films, comprising: a box-like light tight casing having four walls and provided with a lens in the front wall thereof and a means for dividing light passing to the interior of said casing through said lens; a pair of spaced partition walls substantially in the center of said casing and extending longitudinally thereof; a vertical end plate joining the forward ends of said partitions; a main drive shaft journaled between the rear wall of said casing and said end plate and extending forward of the latter; a horizontal transverse shaft extending through said partition walls and provided with a film feed sprocket on each end, said shaft being driven through a gear train by said main drive shaft; a horizontal transverse shaft mounted in and between said partition walls above said main drive shaft which is provided with a pair of pulleys and is driven by a gear connection with said main drive shaft, said pulleys being adapted to drive take-up reels in a pair of magazines removably fastened to the upper side of said casing; film advancing mechanisms for simultaneously advancing a film across each of the divergent light paths emerging from said light dividing means; and a rotatable shutter driven by a shaft engaging said main drive shaft and synchronized with said film advancing means.

6. A camera adapted to simultaneously expose a plurality of cinematographic films, comprising: a box-like light tight casing having four walls and provided with a lens in the front wall thereof and a means for dividing light passing to the interior of said casing through said lens; a pair of spaced partition walls substantially in the center of said casing and extending longitudinally thereof; a vertical end plate joining the forward ends of said partitions; a main drive shaft journaled between the rear wall of said casing and said end plate and extending forward of the latter; a horizontal transverse shaft extending through said partition walls and provided with a film feed sprocket on each end, said shaft being driven through a gear train by said main drive shaft; a horizontal transverse shaft mounted in and between said partition walls above said main drive shaft which is provided with a pair of pulleys and is driven by a gear connection with said main drive shaft, said pulleys being adapted to drive take-up reels in a pair of magazines removably fastened to the upper side of said casing; a pair of angularly disposed vertical aperture plates adjacent said light dividing means, each being provided with an aperture adapted to receive one of the portions of light emerging from said light dividing means; a pressure plate opposite each of said apertures adapted to hold said films firmly against their respective aperture plates, said pressure plates being provided with vertical slots on opposite sides; a vertically reciprocating carriage having substantially perpendicular arms extending across said apertures; a pair of pull-down pins in each arm; means for horizontally reciprocating said pins so that they enter perforations of said film at their uppermost position and disengage therefrom at their lowermost position; and a rotatable shutter synchronized with said film advancing mechanisms to expose said films during the time they are held stationary by said pressure plate.

7. A camera adapted to simultaneously expose a plurality of cinematographic films, comprising: a box-like light tight casing having four walls and provided with a lens in the front wall thereof and a means for dividing light passing to the interior of said casing through said lens; a pair of spaced partition walls substantially in the center of said casing and extending longitudinally thereof; a vertical end plate joining the forward ends of said partitions; a main drive shaft journaled between the rear wall of said casing and said end plate and extending forward of the latter; a horizontal transverse shaft extending through said partition walls and provided with a film feed sprocket on each end, said shaft being driven through a gear train by said main drive shaft; a horizontal transverse shaft mounted in and between said partition walls above said main drive shaft which is provided with a pair of pulleys and is driven by a gear connection with said main drive shaft, said pulleys being adapted to drive take-up reels in a pair of magazines removably fastened to the upper side of said casing; a pair of angularly disposed vertical aperture plates adjacent said light dividing means, each being provided with an aperture adapted to receive one of the portions of light emerging from said light dividing means; a pressure plate opposite each of said apertures adapted to hold said films firmly against their respective aperture plates, said pressure plates being provided with vertical slots on opposite sides; a vertically reciprocating carriage having substantially perpendicular arms extending across said apertures; a pair of pull-down pins in each arm; means for horizontally reciprocating said pins so that they enter perforations of said film at their uppermost position and disengage therefrom at their lowermost position; and a rotatable shutter driven through a gear train by a stub shaft mounted in said front wall and adapted to engage the forward end of said main drive shaft, said stub shaft being provided with a substantially non-vibration conducting coupling intermediate said shutter and said main drive shaft.

8. A camera adapted to simultaneously expose a plurality of cinematographic films comprising: a light tight casing provided with a lens, a shutter and a light dividing means in optical alignment; an aperture plate with an aperture in the path of each light beam emerging from said light dividing means; means for advancing separate films across each of said apertures; rotatable means adapted to withdraw said films from said advancing means; a substantially vertical guide plate with one face terminating adjacent the periphery of said rotatable means; a guide shoe adapted to be placed in substantial contact with said guide plate to provide a restricted passage for a film leaving said rotatable means so that the same will be held against lateral motion but free to move longitudinally; and means for taking up said film upon its exit from said restricted passage.

9. A camera as defined in claim 8 wherein the guide plate and the guide shoe are each provided with raised edge portions to form a track for the support of the edges of said film.

10. A camera adapted to simultaneously expose a plurality of cinematographic films which comprises: a light tight casing provided with a lens, a shutter and a light dividing means in optical alignment; a main drive shaft disposed longitudinally in said casing; a horizontal transverse shaft disposed in said casing and provided with film feeding means on each end thereof, said shaft being adapted to be driven by said drive shaft; a second horizontal transverse shaft disposed in said casing which is provided with a pair of pulleys and is also driven by said drive shaft, said pulleys being adapted to drive take up reels disposed adjacent to said casing; and means for simultaneously advancing a film across each of the divergent light paths emerging from said light dividing means.

11. A camera adapted to simultaneously expose a plurality of cinematographic films which comprises; a light tight casing provided with a lens, a shutter and a light dividing means in optical alignment; a pair of spaced substantially parallel partition walls in the central portion of said casing and extending longitudinally thereof; a vertical end plate adjacent the forward ends of said partitions; a drive shaft journaled in said end plate; a horizontal transverse shaft extending through said partition walls and provided with a film feed sprocket on each end thereof; said shaft being driven by said drive shaft; film advancing means for simultaneously advancing a separate film across each of the divergent light paths emerging from said light dividing means; said films passing from said advancing means back to said feed sprocket; and means comprising pulleys driven by said drive shaft for taking up said films after they leave their respective feed sprockets.

12. A camera adapted to simultaneously expose a plurality of cinematographic films comprising: a casing having a lens therein and a light-dividing means in line with said lens; a shutter optically aligned with said lens; plate means provided with a pair of angularly disposed apertures, one of said apertures being in the path of each light beam emerging from said light-dividing means; a vertically movable carriage provided with a pair of arms extending laterally of said apertures and adjacent thereto; a single pair of substantially horizontal pull-down pins slidably mounted in each of said arms, one end of said pins being adapted to engage the perforations of a film disposed longitudinally of said aperture and the other end of said pins being connected to a cross-arm; cam means for horizontally reciprocating said pins within said arms; cam means for moving said carriage vertically; driving means for operating both of said cam means; means for holding said films against said apertures while said pull-down pins are out of engagement therewith; and take-up means adapted to withdraw said films after they have been advanced by said pull-down pins.

13. A camera adapted to simultaneously expose a plurality of cinematographic films comprising: a casing having a lens therein and a light-dividing means in line with said lens; a shutter optically aligned with said lens; plate means provided with a pair of angularly disposed apertures, one of said apertures being in the path of each light beam emerging from said light-dividing means; a vertically movable carriage provided with a pair of pull-down pins laterally disposed of each aperture and horizontally movable with respect thereto; the rear ends of each pair of pins being connected to a cross-arm vertically slidable in a guide adapted to be oscillated about a horizontal axis; means for moving said carriage vertically; means for oscillating said guide; means disposed opposite said apertures adapted to hold said films against said apertures while said pull-down pins are out of engagement therewith; and means for taking up said films after they have been advanced past said apertures by said pull-down pins.

14. A camera adapted to simultaneously expose a plurality of cinematographic films comprising: a casing having a lens therein and a light-dividing means in line with said lens; a shutter optically aligned with said lens; plate means provided with a pair of angularly disposed apertures, one of said apertures being in the path of each light beam emerging from said light-dividing means; a pair of horizontally movable pull-down pins disposed adjacent each of said aperture plates, each of said pairs of pins being connected to a cross-arm vertically slidable in a guide adapted to be oscillated by a shaft; means for moving said pins and said cross-arms in a substantially vertical path; means for oscillating said shaft; a resiliently-mounted pressure plate opposite each of said apertures adapted to hold films thereagainst while said pull-down pins are out of engagement with said films; and means for taking up said films after they have been advanced passed their respective apertures.

15. A camera adapted to simultaneously expose a plurality of cinematographic films which comprises: a light tight casing provided with a lens, a light-dividing means in optical alignment with said lens, and a shutter disposed between said lens and said light-dividing means; a pair of spaced substantially parallel partition walls in the central portion of said casing and extending longitudinally thereof; means for journaling a drive shaft in longitudinal position between said partition walls; a horizontal shaft journaled in said partition walls provided with means for moving a pair of films; film-advancing means operatively connected to said drive shaft for simultaneously advancing said films across each of the divergent light paths emerging from said light-dividing means; and means driven by said drive shaft for taking up said films after they have been advanced across their respective apertures by said film-advancing means.

CHARLES F. JONES.